US008760786B2

(12) United States Patent
Mahnad et al.

(10) Patent No.: US 8,760,786 B2
(45) Date of Patent: Jun. 24, 2014

(54) LATERAL TAPE MOTION DETECTOR

(75) Inventors: Faramarz Mahnad, Brookline, MA (US); Scott D. Wilson, Thornton, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/531,875

(22) Filed: Jun. 25, 2012

(65) Prior Publication Data

US 2013/0342930 A1   Dec. 26, 2013

(51) Int. Cl.
*G11B 5/58* (2006.01)
(52) U.S. Cl.
USPC .......................................... 360/55; 360/77.12
(58) Field of Classification Search
None
See application file for complete search history.

(56) References Cited

U.S. PATENT DOCUMENTS

| 4,913,328 | A | | 4/1990 | Schulz |
| 5,412,474 | A | | 5/1995 | Reasenberg et al. |
| 5,457,586 | A | | 10/1995 | Solhjell |
| 5,991,112 | A | * | 11/1999 | Song et al. ................. 360/75 |
| 2002/0075588 | A1 | | 6/2002 | Cottles et al. |
| 2005/0094308 | A1 | * | 5/2005 | Mahnad et al. ............. 360/75 |

FOREIGN PATENT DOCUMENTS

| EP | 0 469 712 A2 | 2/1992 |
| EP | 1528541 A1 | 5/2005 |
| GB | 2008290 A | 5/1979 |
| WO | 95/14210 A1 | 5/1995 |

OTHER PUBLICATIONS

International Searching Authority, Communication Relating to the Results of the Partial International Search, issued in PCT/US2013/04629 (filed Jun. 13, 2013), mailed Sep. 5, 2013, 2 pages.
International Search Report dated Nov. 22, 2013 in corresponding PCT/US2013/045629 filed Jun. 13, 2013, 6 pgs.

* cited by examiner

*Primary Examiner* — Wayne Young
*Assistant Examiner* — Brian Butcher
(74) *Attorney, Agent, or Firm* — Brooks Kushman P.C.

(57) ABSTRACT

A tape edge sensor system for detecting lateral movement of a storage tape includes a first photo-emitter, a first photo-detector positioned to receive a first light signal from the first photo-emitter, a first aperture disposed between the first photo-emitter and the first photo-detector, and a feedback system connected to the first photo-emitter and the first photo-detector. The first aperture defines a first region at a first tape edge through which the first light signal is received by the first photo-detector with the storage tape blocking a portion of the first light signal. The feedback system determines the first photo-detector's signal amplitude and adjusts the first light signal such that the first photo-detector signal amplitude is within a first average amplitude range. A tape edge sensor system using compensating photo-interrupters is also provided.

16 Claims, 11 Drawing Sheets

LATERAL TAPE MOTION DETECTOR

The present invention relates to systems and methods for detecting lateral tape movement in an optical or magnetic storage tape drive.

BACKGROUND OF THE INVENTION

In the storage tape drive industry, transmissive optical sensors have been used to measure the dynamic behavior of the edge of the tape traveling on a tape transport subsystem. This technique generally has been used to estimate lateral motion of the tape (LTM) at any location in the tape transport subsystem. The accuracy and sensitivity of this type of measurement, however, is severely impacted by several limitations. Such limitations include imperfection of edge profile that incorrectly registers as LTM, sensitivity limitation due to optical setup, and electro-mechanical and optical noise and drift contamination Lateral tape motion (LTM) is problematic in tape drives especially as track pitches get smaller and smaller in new generations of magnetic and optical tape drives. Magnetic and optical read/write heads must be servoed to follow track lateral motion to typically better than 1/10th or 1/20th of the track pitch in order to maintain data integrity. As track pitches get smaller, for example, 320 nm in an optical tape drive, LTM measurements accurate to microns or tens of microns are no longer adequate. Precise measurement of LTM is a valuable tool that can aid tape path engineers in minimizing LTM. Having precise tape edge sensors in a production tape drive could be used to reduce LTM by applying feed-forward servo techniques. To measure LTM, optical sensors, such as photonic probes and photo-interrupters, have been used but have characteristics that limit their accuracy and resolution to unacceptable levels compared to the 10 to 20 nm needed for newer, finer track pitches. An important parameter for optical tape edge sensing is the sample length—the length of tape edge "observed" or integrated at any instant. In order to measure LTM without distortions due to tape edge roughness, a longer segment of tape is measured. If tape edge roughness with LTM is to be measured, a shorter segment is measured. Unfortunately, photonic probes and photo-interrupters also have limited ability to change the sampling length of tape.

Accordingly, there is a need for improved methods of measuring lateral tape motion in storage tape drives.

SUMMARY OF THE INVENTION

The present invention solves one or more problems of the prior art by providing in at least one embodiment a tape edge sensor system for detecting lateral movement of a storage tape in a storage tape drive. Lateral tape motion is movement of the storage tape in a direction perpendicular of the storage tape movement during read/write operations. The tape edge sensor system includes a first photo-emitter emitting a first light signal and a first photo-detector positioned to receive a portion of a first light signal and provide a first detected signal proportional to the portion of the first light signal received by the first photo-detector. The first photo-emitter is modulated such that the first light signal is also modulated. A first baffle defines a first aperture with the first baffle disposed between the first photo-emitter and the first photo-detector. The first aperture acts as an optical filter and defines a first region at the first tape edge at which lateral tape motion is detected. The first tape edge partially blocks the first light signal thereby defining along with the first aperture the portion of the first light signal received by the first photo-detector such that variations in the portion of the first signal received by the first photo-detector occur at least in part due to lateral tape motion. A feedback system connects to the first photo-emitter and the first photo-detector providing the modulation of the first photo-emitter and low pass filtering of the first detected signal to minimize interference from noise and signal drift.

In another embodiment, a system that compensates for flutter movement of a storage tape in a storage tape drive is provided. The system includes a first photo-emitter that emits a first non-collimated light signal and a first photo-detector positioned to receive a portion of the first non-collimated light signal. The first photo-emitter is positioned at a first tape edge adjacent to a first tape side while the first photo-detector is positioned at the first edge adjacent to a second tape side. The first photo-emitter outputs a first detected signal. The first non-collimated light signal is partially blocked by the storage tape at a first tape edge. The system also includes a second photo-emitter that emits a second non-collimated light signal and a second photo-detector positioned to receive a portion of the second non-collimated light signal. The second photo-emitter is positioned at a second tape edge adjacent to the second tape side while the second photo-detector is positioned at the second tape edge adjacent to the first tape side. The second photo-detector emits a second detection signal. The second non-collimated light signal is partially blocked by the storage tape at the first tape edge. The system also includes a control component that combines the first detection signal and the second detection signal such that motion of the storage tape in a direction perpendicular to a tape side is compensated for in a transfer function due to the positioning of the first photo-emitter and the second photo-emitter on opposite sides of the storage tape and the first photo-detector and the second photo-detector on opposite sides of the storage tape.

In another embodiment, a system that compensates for flutter movement of a storage tape in a storage tape drive is provided. The system includes a photo-emitter that emits a light signal, a lens that shapes the light signal, and a first photo-detector positioned adjacent to the second side. A first portion of the light signal is directed towards the first tape edge. The first photo-detector is positioned adjacent to the second side to receive the first portion of the light signal. The first portion of the light signal is partially blocked by the storage tape at the first tape edge.

In still another embodiment, a system for calibrating a tape edge sensor is provided. The system includes a planar calibration substrate, a linear translation device that moves the planar calibration substrate in a linear direction, a monochromatic light source that emits a light signal, a photo-detector, a moveable reflector attached to the linear translation device that moves in unison with the planar calibration substrate, a stationary reflector; and a beam splitter. The moveable reflector moves in unison with the planar calibration substrate. The beam splitter directs a first portion of the light signal towards the moveable reflector and a second portion of the light signal towards the stationary reflector. The stationary reflector directs a third portion of the light signal back towards the beam splitter where a fourth portion of the light is directed towards the photo-detector. The moveable reflector reflects a fifth portion of the light signal back towards the beam splitter where a sixth portion of the light signal is transmitted to the photo-detector. The fourth portion of the light signal and the sixth portion of the light signal constructively and destructively combine to form an interference pattern as a function of position of the planar calibration substrate. The interference pattern has a period that allows determination of a distance traversed by the planar calibration substrate.

It should be appreciated that the embodiments and variations of the present invention provide a number of advantages. The tape edge sensor systems increase detection sensitivity will reducing noise and drift interference. Application of four sets of sensor allows for information regarding lateral motion of the storage tape to be transmitted to a tape head's tracking servo which can be used to provide a more effective control signal to reduce tracking error.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1A:
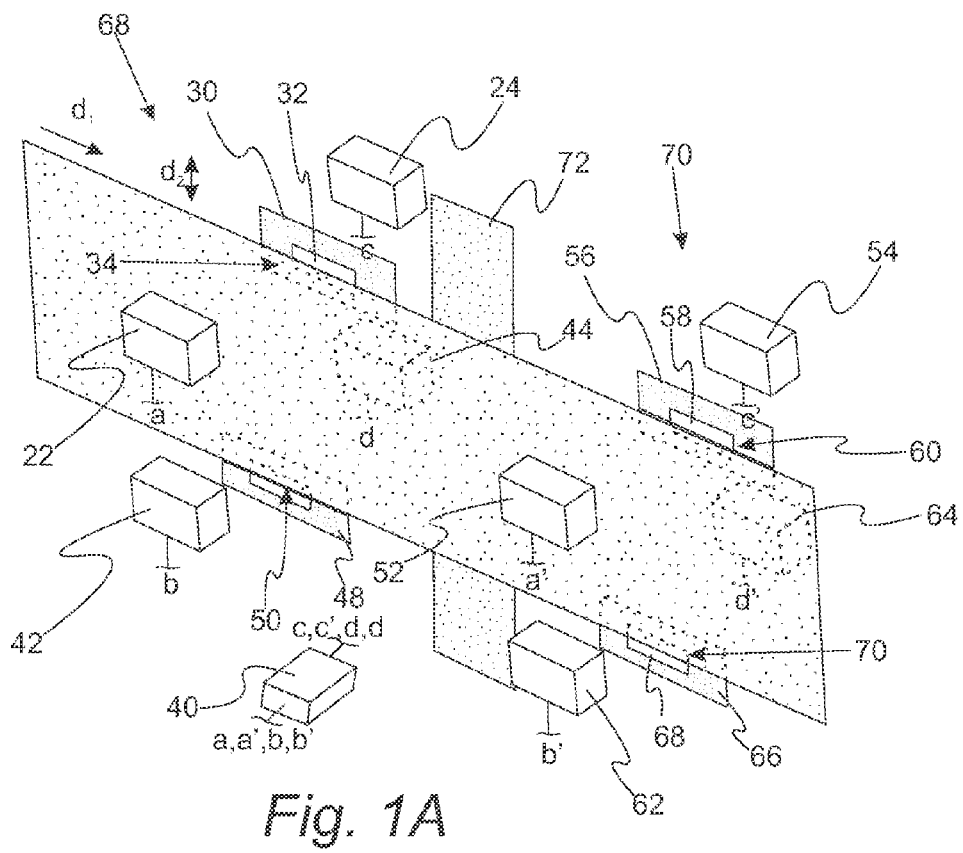
FIG. 1A provides a perspective view of a tape edge sensor system for detecting lateral tape movement in a storage tape drive using measurements at one to four positions.
Figure 1B:
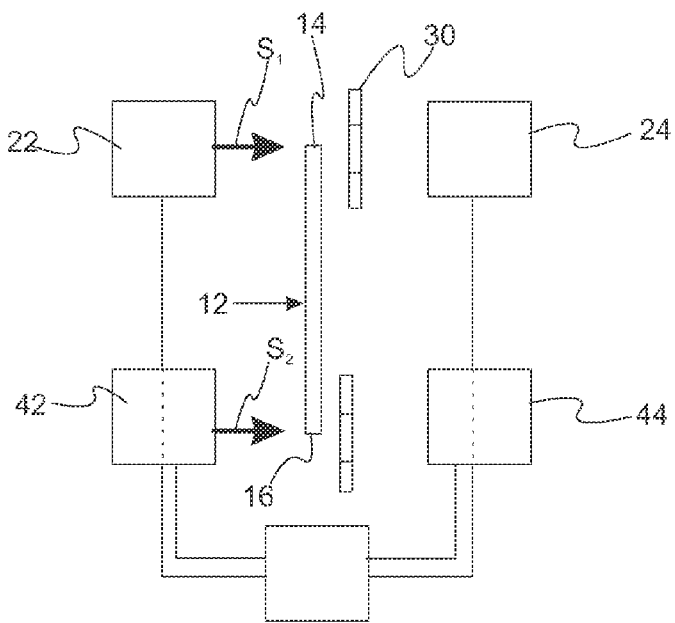
FIG. 1B provides a side view of a tape edge sensor system for detecting lateral tape movement in a storage tape drive using measurements at one to four positions.

With reference to FIG. 1, a tape edge storage system for detecting lateral tape movement (LTM) of a storage tape in a storage tape drive is provided. System 10 is used to detect such lateral movement of storage tape 12. Storage tape 12 includes first tape edge 14, second tape edge 16, first tape side 18 and second tape side 20. During operation, tape 12 moves along direction $d_1$ with lateral tap motion occurring along direction $d_2$. Typically, the lateral tape motion has a frequency from 0 to about 10 kHz. System 10 includes first photo-emitter 22 which emits a light signal $S_1$, first photo-detector 24 which is positioned to receive a portion of first light signal $S_1$. First photo-emitter 22 is modulated such that the first light signal is also modulated. First photo-detector 24 outputs a first detection signal proportional to the portion of the first light signal received by first photo-detector 24. In a refinement, first photo-emitter 22 is a laser diode and/or first photo-detector 24 is a photodiode (a transmissively optically coupled device). First baffle 30 includes first aperture 32 disposed between first photo-emitter 22 and first photo-detector 24. First aperture 32 defines first region 34 at first tape edge 14 through which a portion of the first light signal $S_1$ is received by first photo-detector 24. The first tape edge 14 partially blocks the first light signal (i.e., baffle 30 is placed in the optical path of first photo-detector 24 and first tape edge 14) thereby defining along with first aperture 32 the portion of the first light signal received by first photo-detector 24 such that variations in the portion of the first signal received by first photo-detector 24 occur at least in part due to lateral tape motion.

System 10 also includes feedback system 40 connected to first photo-emitter 22 and to first photo-detector 24. The profile of tape 12 creates a signal that is picked up and registered as tape motion. It should be appreciated that there are at least two types of tape motions. One motion is a standing wave motion in which tape 12 moves up and down along direction $d_2$. The other motion is a traveling wave motion in which tape 12 twists and bends. Differentiating between these two types of motion is difficult if only a single photo-emitter/photo-detector configuration is used. Variations addressing this issue are set forth below.

In a refinement, feedback system 40 connects to first photo-emitter 22 and first photo-detector 24. Feedback system 40 also provides the amplitude modulation of first photo-emitter 22 and low pass filtering of the first detected signal to minimize interference from noise and signal drift. In a refinement, feedback system 40 receives the first detection signal and adjusts the first light signal such that the first detection signal's amplitude is within a first average amplitude range. Feedback system 40 also outputs a first output signal representing deviation of the first tape edge from a predetermined value. The details of a variation of feedback system 40 are set forth below in more detail.

Figure 2A:
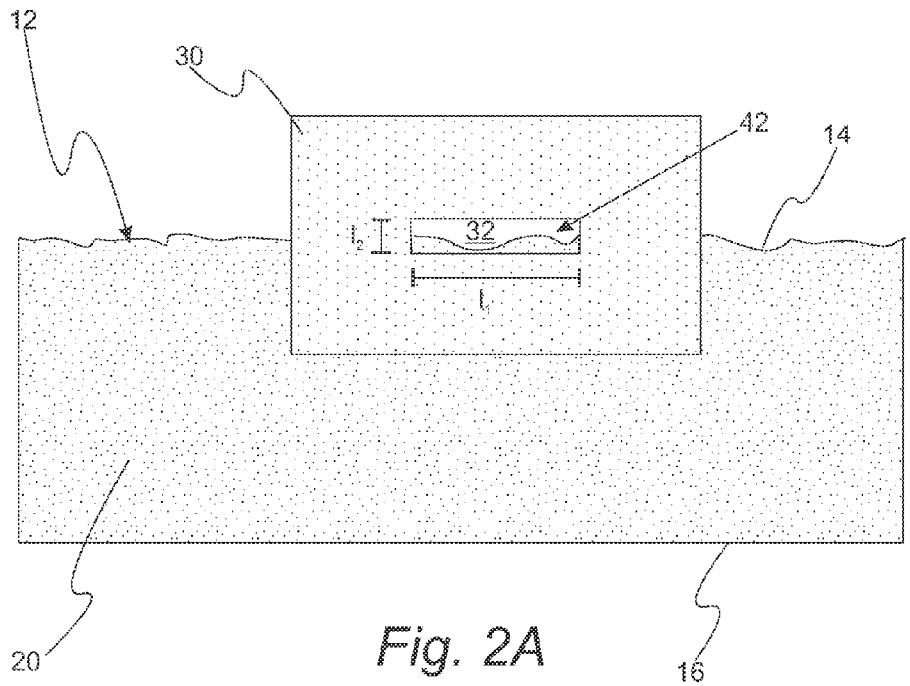
FIG. 2A provides a schematic illustration of a baffle used in the tape edge sensor system of FIG. 1 with an aperture's long axis arranged parallel to the tape direction of motion during read/write operation.
Figure 2B:
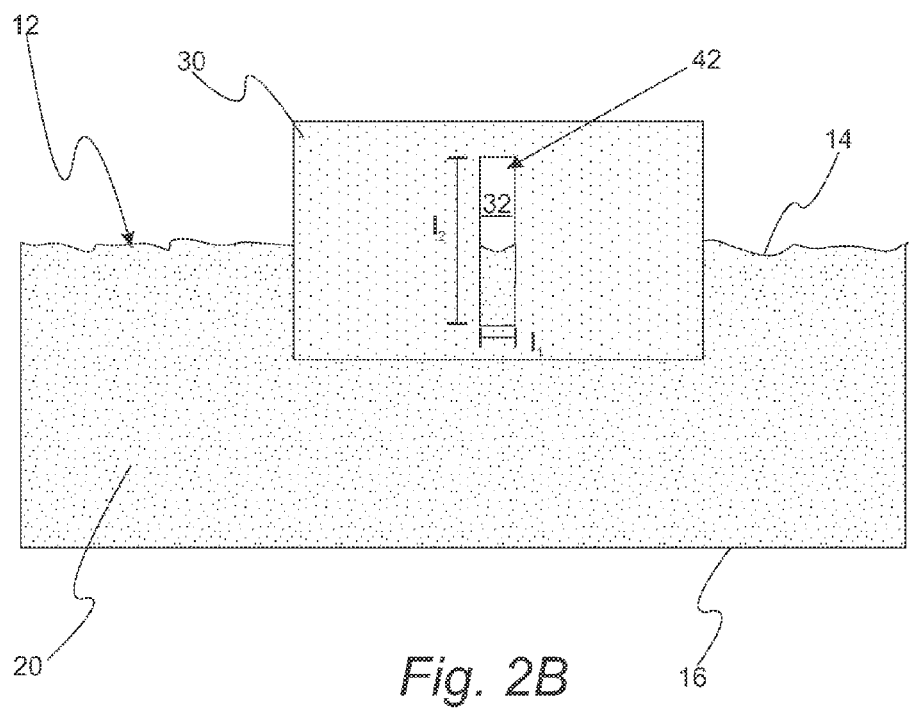
FIG. 2B provides a schematic illustration of a baffle used in the system of FIG. 1 with an aperture's long axis arranged perpendicular to the tape direction of motion during read/write operation.

FIGS. 2A and 2B provide schematics of different aperture orientations. Aperture 32 operates as an optical filter in variations of the invention. Aperture 32 is characterized by two spatial dimensions—$1_1$ and $1_2$. In FIG. 2A, $1_1$ is greater than $1_2$ with $1_1$ aligned substantially parallel to the direction of tape motion $d_1$. This configuration is somewhat immune to edge tape damage and/or edge roughness during the LTM measurements. In FIG. 2B, $1_2$ is greater than $1_1$ with $1_1$ aligned substantially parallel to the direction of tape motion $d_1$. This configuration is sensitive to edge tape damage and/or edge roughness during the LTM measurements and, therefore, provides a technique for assessing such damage.

In a variation of the present embodiment, system 10 further includes second photo-emitter 42, second photo-detector 44 which is positioned to receive a portion of second light signal $S_2$ from second photo-emitter 42. In a refinement, second photo-emitter 42 is a laser diode and/or first photo-detector 44 is a photodiode. Second photo-emitter 42 is modulated such that the second light signal is also modulated. Second photo-detector 44 outputs a second detected signal proportional to the portion of the first light signal received by first photo-detector 44. Second baffle 46 includes second aperture 48 and is disposed between second photo-emitter 42 and second photo-detector 44. Second aperture 48 defines second region 50 at second tape edge 16 through which the second light signal is received by second photo-detector 44 with storage tape 12 blocking a portion of the second light signal. In this variation, top and bottom motion is coordinated thereby providing better information on motion of tape 12 (e.g. tape edge damage or tape width which may vary) changes. In a refinement, feedback system 40 connects to second photo-emitter 42 and second photo-detector 44. Feedback system 40 also provides the amplitude modulation of first photo-emitter 42 and low pass filtering of the second detected signal to minimize interference from noise and signal drift. Feedback system 40 receives the second detected signal amplitude and adjusts the second light signal such that the second detected signal amplitude is within a second average amplitude range. Feedback system 40 also outputs a second output signal representing deviation of the second tape edge from a predetermined value.

In still a further variation of the present embodiment, system 10 further includes two additional photo-emitter/diode pairs as set forth above. Specifically, system 10 further includes third photo-emitter 52, and third photo-detector 54 which is positioned to receive a third light signal from third photo-emitter 52. In a refinement, third photo-emitter 52 is a laser diode and third photo-detector 54 is a photodiode. Third photo-emitter 52 is modulated such that the third light signal is also modulated. Third photo-detector 54 outputs a third detection signal proportional to the portion of the third light signal received by third photo-detector 54. Third baffle 56 includes third aperture 58 and is disposed between third photo-emitter 52 and third photo-detector 54. Third aperture 58 defines third region 60 at first tape edge 14 through which the third light signal is received by third photo-detector 54 with storage tape 12 blocking a portion of the third light signal. In this variation, system 10 further includes fourth photo-emitter 62 and fourth photo-detector 64 which is positioned to receive a fourth light signal from fourth photo-emitter 62. Fourth photo-emitter 62 is modulated such that the fourth light signal is also modulated. Fourth photo-detector 64 outputs a fourth detection signal proportional to the portion of the fourth light signal received by fourth photo-detector 44. In a refinement, first photo-emitter 62 is a laser diode and/or first photo-detector 64 is a photo-diode. Fourth baffle 66 includes fourth aperture 68 and is disposed between fourth photo-emitter 62 and fourth photo-detector 64. Fourth aperture 68 defines fourth region 70 at second tape edge 16 through which the fourth light signal is received by fourth photo-detector 64 with storage tape 12 blocking a portion of the fourth light signal. In a refinement, stabilizer 72 is placed between pairs of photo-detectors to stabilize movement of tape 12. In such refinement, the tape head is positioned on the opposite side of stabilizer 72. Third photo-emitter 52 and third photo-detector 54 are also connected to feedback system 40 as set forth above.

In a refinement, feedback system 40 connects to third photo-emitter 52 and third photo-detector 54. Feedback system 40 also provides the amplitude modulation of third photo-emitter 52 and low pass filtering of the third detected signal to minimize interference from noise and signal drift. In a further refinement, feedback system 40 receives the third detected signal and adjusts the third light signal such that the third detection signal's amplitude is within a third average amplitude range. Feedback system 40 also outputs a third output signal representing deviation of the first tape edge from a predetermined value. Similarly, fourth photo-emitter 62 and fourth photo-detector 64 are also connected to feedback system 40 as set forth above with feedback system 40 also providing the amplitude modulation of fourth photo-emitter 62 and low pass filtering of the fourth detected signal to minimize interference from noise and signal drift. In still a further refinement, feedback system 40 receives a fourth detected signal amplitude and adjusts the fourth light signal such that the fourth detection signal's amplitude is within a fourth average amplitude range. Feedback system 40 also outputs a fourth output signal representing deviation of the second tape edge from a predetermined value.

As set forth above, tape motion may be characterized by both a standing wave and a traveling wave motion. The utilization of four photo-emitter/photo-detector pairs provides better differential between these two motions than one or two photo-emitter/photo-detector pairs. For example, if a signal denoting tape movement is first observed at photo-detectors 24 and 44 and then after some time interval at photo-detectors 54 and 64, it may be concluded that the tape motion is that of a traveling wave. In contrast, a continuous signal indicates that tape motion is received simultaneously at photo-detectors 24, 44, 54 and 64. These measurements are to some extent independent of tape edge damage.

In this variation, four photo-detectors with associated apertures are placed on the sides of the tape stabilizer. The utilization of four photo-detectors improves the accuracy of the LTM measurements as follows with pair of photo-detectors 24, 44 located at forward position 68 relative to stabilizer 72 and pair of photo-detectors 54, 64 located at back position 70 relative to stabilizer 72. The calculation of LTM is accomplished via the following equations:

$$A = LTM_a + N_a$$

$$B = LTM_b + N_b$$

$$C = LTM_c + N_c$$

$$D = LTM_d + N_d$$

Where A, B, C, D are the signals from photo-detectors 24, 44, 54, and 64, respectively $N_a$, $N_b$, $N_c$, and $N_d$ are non-coherent noise associated with each detector; $LTM_a$, $LTM_b$, $LTM_c$, and $LTM_d$ are the lateral tap motion detected by photo-detectors 24, 44, 54, and 64, respectively; $LTM_f$ is the lateral tape motion at forward position 68; and $LTM_b$ is the lateral tape motion at rear position 70. Since $LTM_a = LTM_b = LTM_f$ and $LTM_c = LTMd = LTMb$ then $A+B = 2LTMf+Na+Nb$ implies that $LTM_f = (A+B)/2 + (N_a+N_b)/2$. Since $N_a$ and $N_b$ are non-coherent noise then $(N_a+N_b)/2 < N_a$ or $N_b$ and $C+D = 2LTM_b + N_c+N_d = > LTM_b = (C+D)/2 + (N_c+N_d)2$. Since $N_c$ and $N_d$ are non-coherent noise then $(N_c+N_d)/2 < N_c$ or $N_d$. Therefore, $LTM_f$ and $LTM_b$ are more accurate measurements at positions 68 and 70. Moreover, if there is an instantaneous tilt on tape due to the tape transport system or the stabilizer itself, then $LTM_f(t) \neq LTM_b(t)$ and, therefore, $Tilt = LTMf(t) - LTMb(t)$ With reference to FIGS. 1A, 1B, 2A, and 2B, various orientations of the aperture are provided. FIG. 2A provides a refinement in which aperture 32 is placed with its long axis parallel to tape edge 14. This arrangement allows increase of sensitivity of photo-detector 24 to edge displacement or motion due to the implied boundaries of the aperture on the optical path (i.e. the maximum and minimum light detected by the detector is geometrically concentrated in the region near the edge of the tape). Application of this type of aperture has also the advantage of suppressing contaminating effects of the edge cut or edge damage. Upon careful examination of the aperture field of view of the tape edge at any instance of time, it becomes clear that, although the instantaneous standing wave motion of tape (actual LTM) is precisely detected by the detector due to the change of emitted light passing over the tape edge, the traveling wave motion of the tape edge that has wavelength less than the length of the aperture is averaged and thus optically filtered. This phenomenon is very desirable because the tape edge shape profile (damaged edge included) is of the traveling wave type and it is faltered and suppressed in this optical setup.

In a variation of the present embodiment, the light signals emitted from the photo-emitters are modulated. For example, the applied current through a laser diode results in modulation of the light intensity detected by photo-detector 24. Band pass filtering and other signal processing are employed. For example, the detector's collector/emitter current is filtered at the carrier frequency of the light modulated diode (i.e. demodulating detector sensed signal). Sensitivity of detector to modulating diode increases sensitivity by reducing contamination caused by external optical and electrical noise. Typically, this carrier frequency is much higher (greater than or equal to about 100 kHz) than the typical frequency for LTM (0 to 10 kHz). This principle can be utilized in LTM detector setup as shown in FIG. 2. The accuracy of the LTM registered by the transmissive optical pair and aperture set up described previously, and further modulation of the lasing light and then demodulating as explained here, improves considerably. Since LTM is stationary with respect to the optical motion detector setup described here, the mean value of the measured LTM must stay constant given no component drift or other low frequency electromechanical and environmental disturbances.

Figure 3:
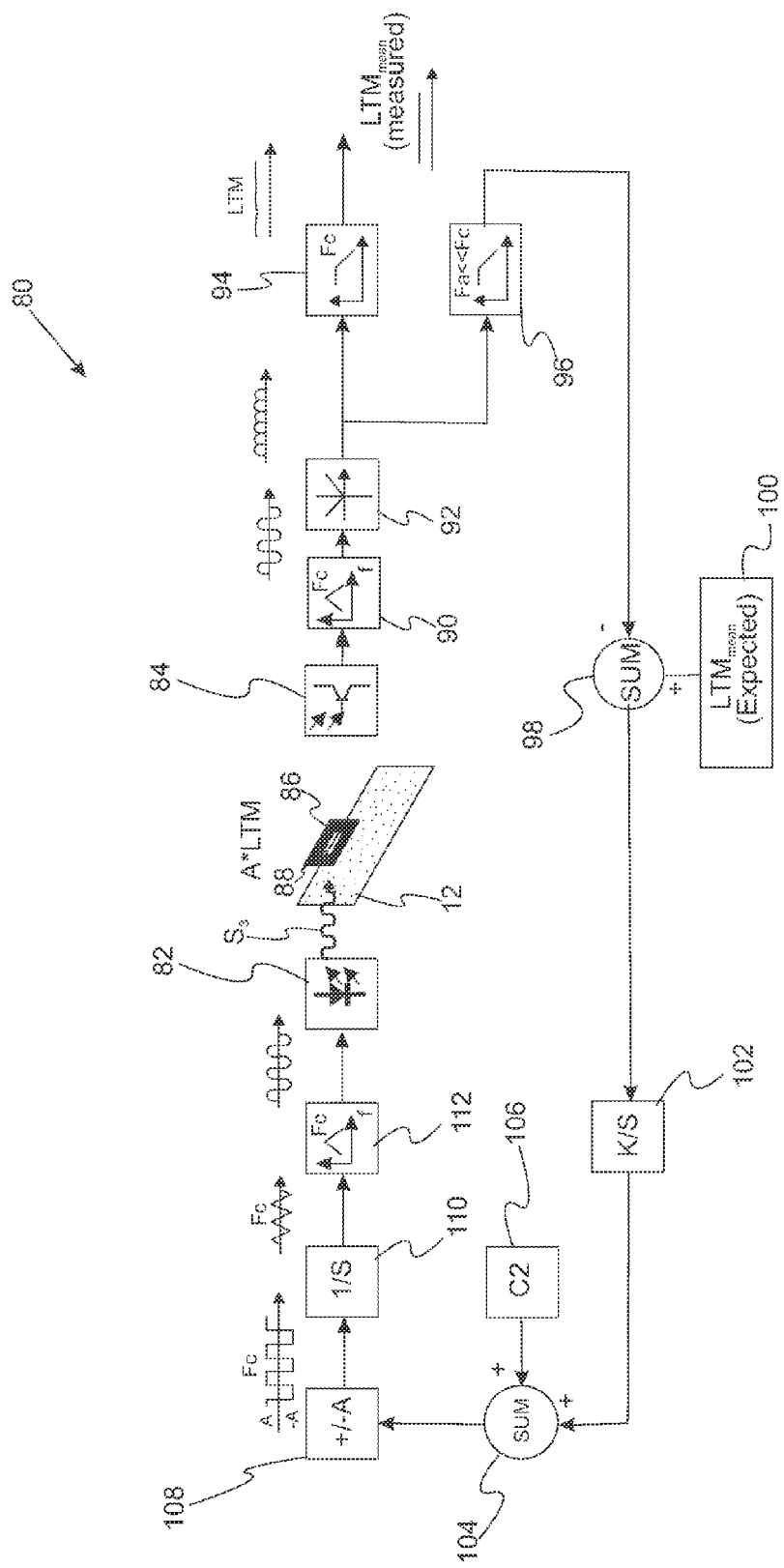
FIG. 3 provides a schematic of a feedback system used to reduce noise in the edge tape sensor system of FIGS. 1A and 1B.

With reference to FIG. 3, a schematic illustration of a feedback system used in the lateral tape movement detection system set forth above is provided. The feedback system uses amplitude modulation (AM) to minimize the effects of noise and drift during LTM detection. LTM detection system 80 includes photo-emitter 82, photo-detector 84, and baffle 86 which defines aperture 88. Photo-emitter 82, photo-detector 84, baffle 86, and aperture 88 are configured as set forth above. Photo-emitter 82 emits an amplitude modulated light signal $S_3$ which is transmitted to photo-detector 84. The upper edge of tape 12 partially blocks the light signal with signal $S'_3$ being received by photo-detector 84. The output of photo-detector 84 is filtered by bandpass filter 90 which is centered about frequency $f_c$—the approximate frequency at which the light signals are amplitude modulated. The output of bandpass filter 90 is then passed through full wave rectifier 92 which provides an AC signal in which negative values are converted to positive values. The output of full wave rectifier 92 is provided to low pass filter s 94 and 96. The cutoff frequency fa of both low pass filter 94 and 96 is lower than fc. The pass filter 94 provides an output signal indicative of the LTM while the output of low pass filter 96 is provided to a summing circuit 98. At the set point voltage is provided to the summing circuit 98 and compared to the output of low pass filter 96. A difference between the set point voltage and the signal from low pass filter 96 is determined and then provided to summing circuit 104. A frequency converter 106 provides an AC signal to summing circuit 104. Therefore, summing circuit 104 outputs an AC signal to square wave generator 108 which outputs a square wave of frequency fc. The square wave is provided to integrator 110 thereby outputting a triangular wave of frequency fc. The frequency output by square wave generator 108 is set to a much greater value (greater than or equal to 100 kHz) than the frequency typical of lateral tape motion (0 to 10 kHz). The triangular wave passes through band-pass filter 112 and is converted to a sign wave that is used to drive photo-emitter 82. The feedback loop of the present refinement typically sets a LTM voltage to correspond to the tape blocking approximately half of the area of aperture 88. This provides for normalization of the scaling of the detector and suppression of measurement variation due to the temperature drift and external optical and electrical noises. The automatic gain control (AGC) loop presented in FIG. 3 adjusts the amplitude of the modeling light at the diode level to insure suppression of any component drift and other ultra-low frequency disturbances.

Figure 4A:
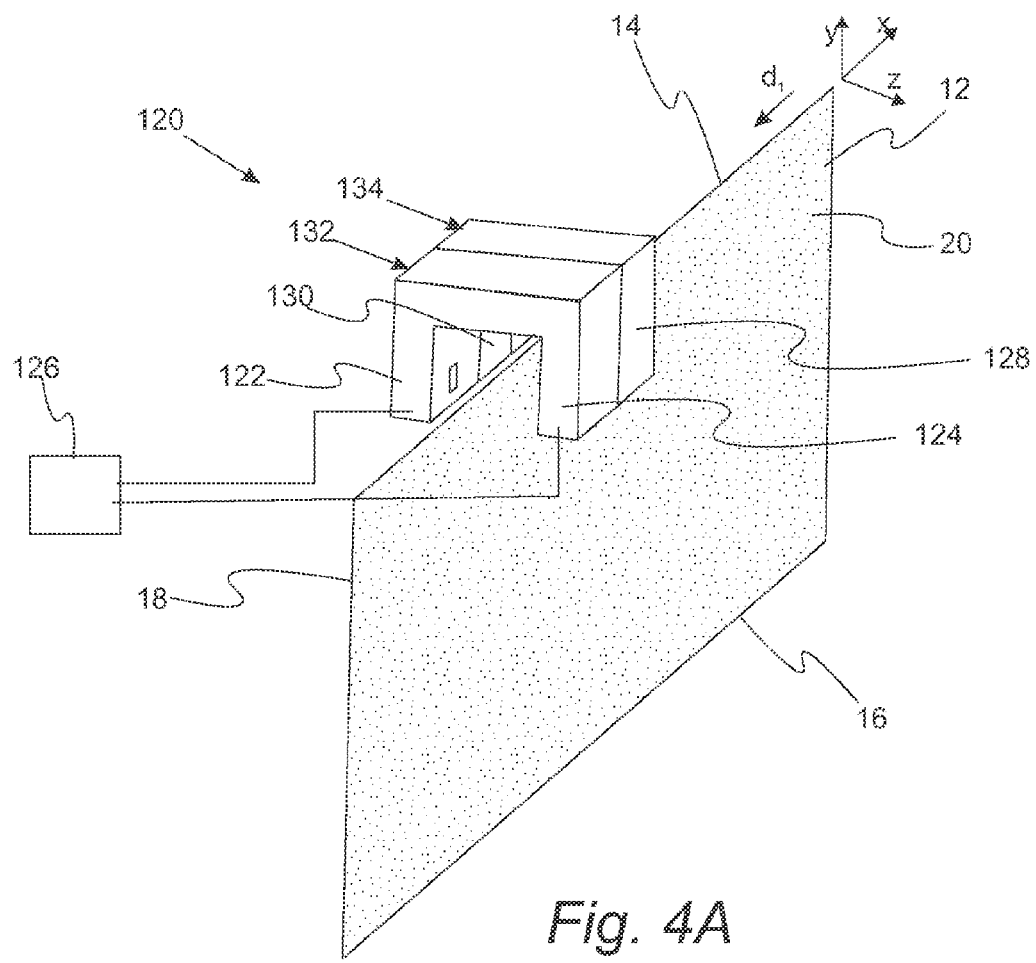
FIG. 4A is a perspective view of a tape edge sensor system for detecting lateral tape movement in a storage tape drive that compensates for flutter (i.e., Z-direction motion) in the storage tape.
Figure 4B:
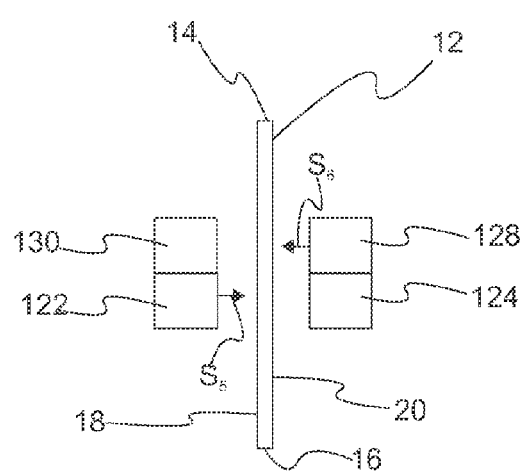
FIG. 4B is a top view of a tape edge sensor system for detecting lateral tape movement in a storage tape drive that compensates for flutter (i.e., Z-direction motion) in the storage tape.

In another embodiment, a tape edge sensor system for minimizing the effects of tape flutter in a storage tape drive is provided. FIGS. 4A and 4B provide schematic illustrations for a system that compensates for "flutter" movement of a storage tape in a storage tape drive. Flutter motion is characterized by a motion along the "z axis"—a direction perpendicular to the tape surface and tape direction of motion $d_1$.

Figure 5:
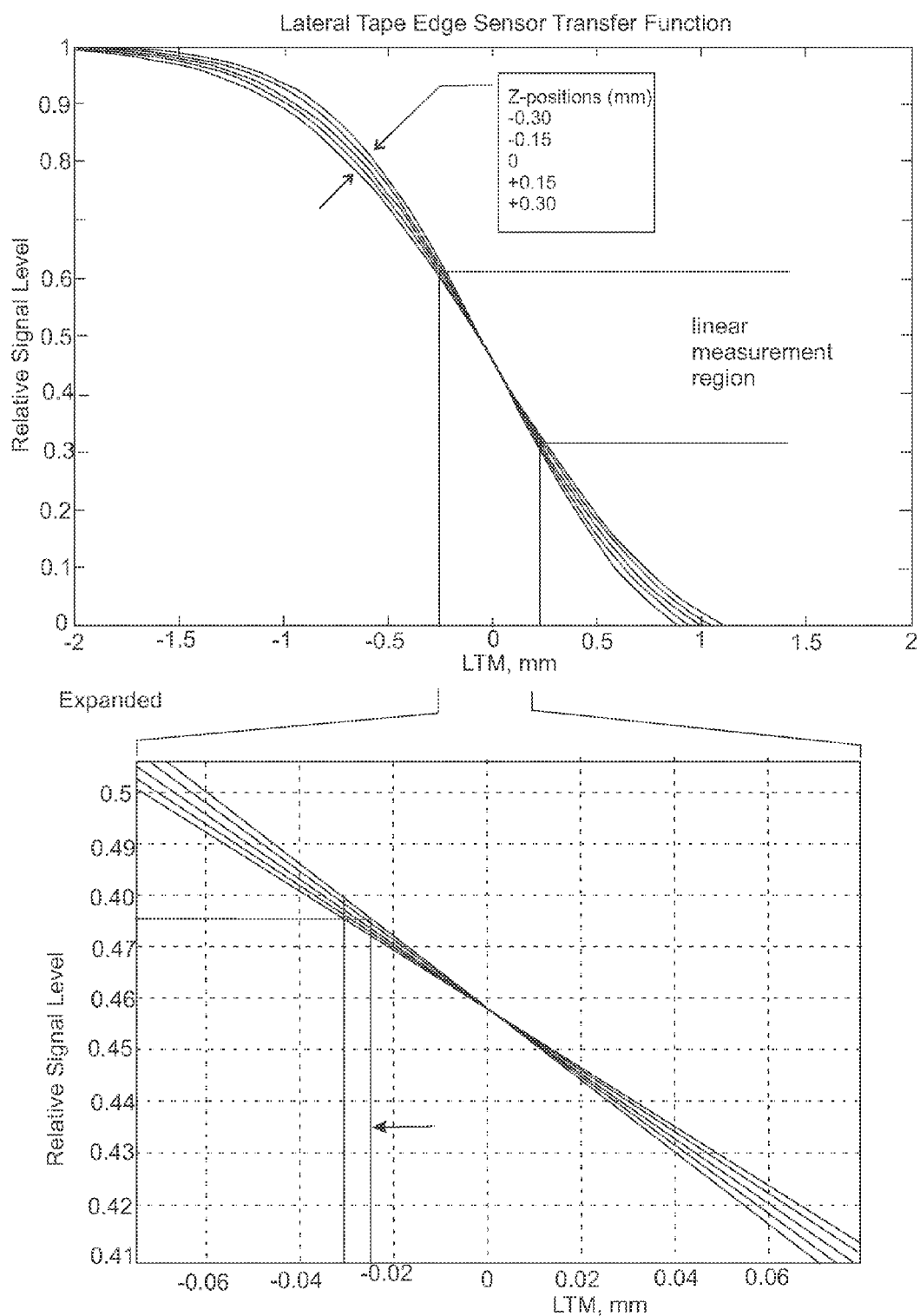
FIG. 5 provides plots that demonstrate the effects of tape flutter on LTM measurements.

Prior methods for tape edge sensing either do not use collimated (parallel) light and/or have mismatched light radiation patterns and detector sensitivity patterns. This causes the sensor's transfer function to vary with tape flutter as set forth in FIG. 5. In the present embodiment, this tape flutter is compensated for by using two photo-interrupters placed adjacently over the tape edge but with their orientations reversed.

Still referring to FIGS. 4A and 4B, a system that compensates for "flutter" movement of a storage tape in a storage tape drive is provided. Storage tape 12 includes first tape edge 14, second tape edge 16, first tape side 18 and second tape side 20. System 120 includes first photo-emitter 122 which emits first non-collimated light signal $S_5$ and first photo-detector 124. First photo-emitter 122 is positioned adjacent to first tape side 18 while first photo-detector 124 is positioned adjacent to second tape side 20 and to receive a portion of first non-collimated light signal $S_5$. First non-collimated light signal $S_5$ is partially blocked by storage tape 12 at first tape edge 14. System 120 further includes second photo-emitter 128 that emits second non-collimated light signal $S_6$ and second photo-detector 130. Second photo-emitter 128 is positioned adjacent to second tape side 20 while second photo-detector 130 positioned adjacent to first tape side 18. Second photo-detector 130 receives a portion of second non-collimated light signal $S_6$. Second non-collimated light signal $S_6$ is partially blocked by the storage tape at the first tape edge 14. The positioning of first photo-emitter 122 and second photo-emitter 124 on opposite sides of the storage tape, and first photo-detector 124 and second photo-detector 130 on opposite sides of the storage tape, at least partially compensate for movement of the storage tape in a direction perpendicular (i.e., the Z direction) to the first tape side and the second tape side. Signals from first photo-detector 124 and second photo-detector 130 are combined (added) electronically by component 126 so that the resulting signal has no Z-dependence. As the tape's Z-position varies, the change in slope of one photo-interrupter's transfer function has the same magnitude, but opposite sign as the change in slope of the second photo-interrupter and when their signals are added, the opposing slopes of the two sensors cancel. In a refinement, first photo-emitter 122 and first photo-detector 124 are contained within photo-interrupter 132 while second photo-emitter 122 and second photo-detector 130 are contained within photo-interrupter 134. The efficacy of this solution requires that the two photo-interrupters have matching Z-dependencies, that they be vertically aligned so that their transfer functions align to get proper cancellation, and that the tape's Z-motion does not change significantly as it traverses the distance between the two sensors (approximately 3 or 4 mm).

Figure 6:
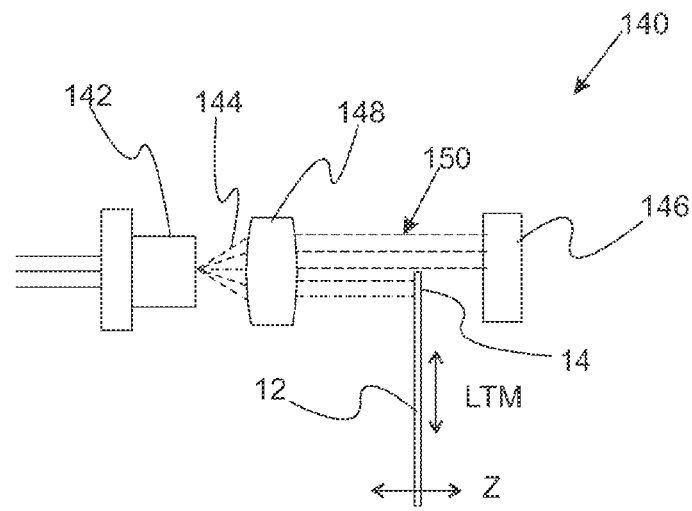
FIG. 6 provides a schematic illustration of a system for detecting lateral tape movement in a storage tape drive in which a single tape edge is monitored to determine LTM using a collimated light source.
Figure 7A:
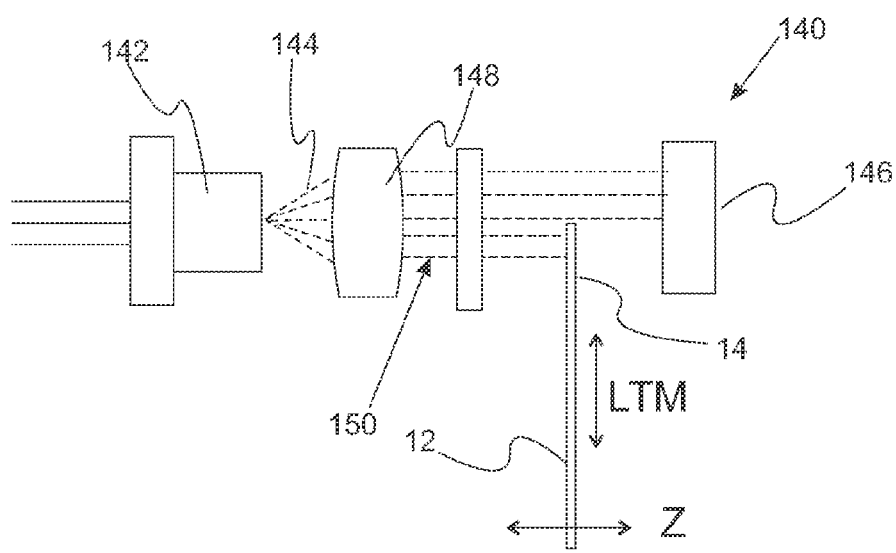
FIG. 7A is a schematic side view of a refinement of the system of FIG. 6 in which a lens is used to shape the light signal incident on a tape edge.
Figure 7B:
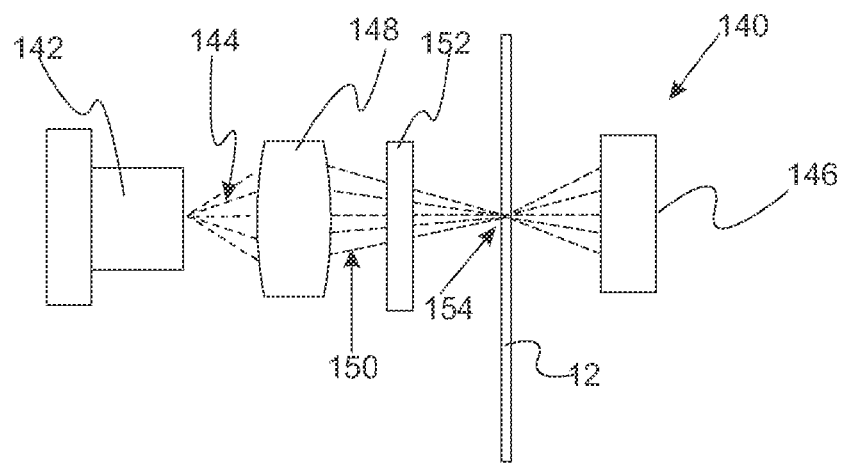
FIG. 7B is a schematic top view of a refinement of the system of FIG. 6 in which a lens is used to shape the light signal incident on a tape edge.
Figures 8A, 8B:
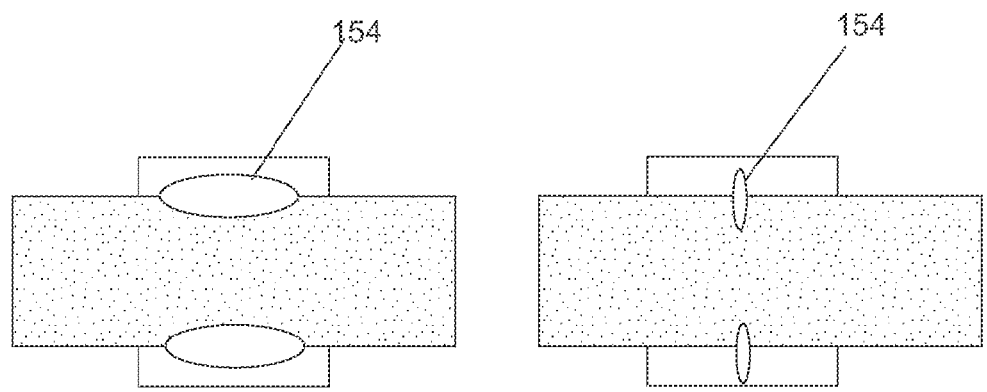
FIG. 8A provides a schematic illustration of an oblong illumination pattern incident on a storage tape edge with the long axis parallel to the direction of tape movement during read/write operations.
FIG. 8B provides a schematic illustration of an oblong illumination pattern incident on a storage tape edge with the long axis perpendicular to the direction of tape movement during read/write operations.

With reference to FIGS. 6, 7A, 7B, 8A, and 8B additional systems for detecting lateral tape movement (LTM) of a storage tape in a storage tape drive are provided. The present embodiments provide additional solutions to the Z-dependency problem using collimated (parallel) light from a laser. FIG. 6 provides a schematic of a system for detecting lateral tape movement in a storage tape drive in which a single tape edge is monitored to determine LTM. System 140 includes photo-emitter 142 which is typically a laser diode which emits a light beam 144 which is partially blocked by first tape edge 14 of tape 12 and received by photo-detector 146 (e.g., a PIN photodiode). System 140 also includes lens 148 which is used to collimate light beam 144 to form a collimated light beam 150. Collimated light beam 150 is aligned perpendicular to the surface of tape 12 falling on a photo-detector 146 on the opposing side of the tape such that a transfer function similar to that from a photo-interrupter is generated. However, in the present case the signal is independent of the tape's Z-position. FIGS. 7A and 7B provide schematic illustration of a refinement of FIG. 6 in which a lens is used to shape the light signal incident on a tape edge. FIG. 7A is a side view while FIG. 7B is a top view. In this refinement, cylindrical lens 152 is used to adjust the optical footprint 154 of the light signal on tape 12 at tape edge 14. Cylinder lens 152 can be added to the optical path to reduce or expand the illumination pattern in only one direction at the plane of the tape as set forth above. Since the laser beam maintains parallelism in the lateral direction (LTM, or vertical in the figure above), Z-dependence of the sensor's transfer function is still minimized. FIGS. 8A and 8B provide illustration of the illumination patterns that are achievable. In FIG. 8A, illumination pattern 154 is oblong with the long axis parallel to the tape edge. As set forth above in connection with FIG. 2A, this configuration is somewhat immune to edge tape damage during the LTM measurements. In FIG. 8B, the illumination pattern is also oblong but with the long axis perpendicular to the tape edge. As set forth above in connection to FIG. 2B, this configuration is sensitive to edge tape damage during the LTM measurements and therefore, provide a technique for assessing such damage.

Figure 9A:
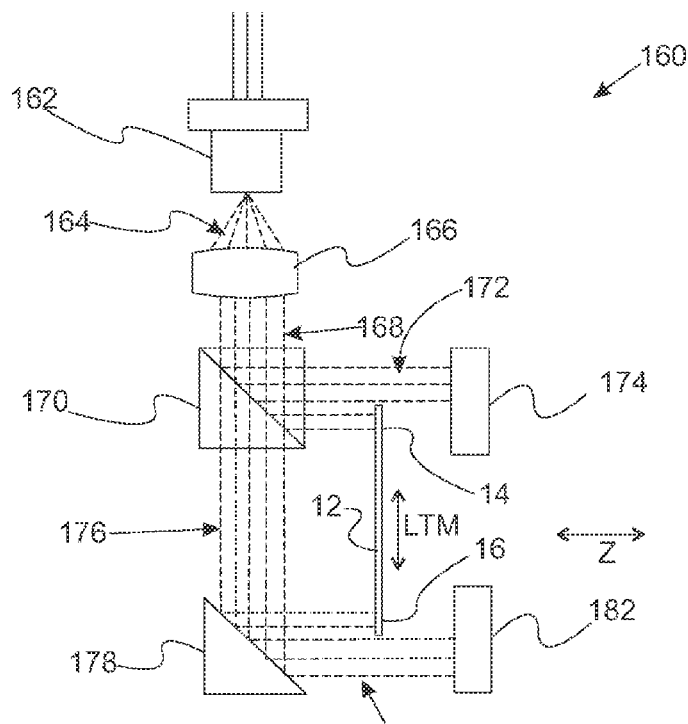
FIG. 9A provides a schematic illustration of a system for detecting lateral tape movement in a storage tape drive in which the top and bottom tape edges are monitored to determine LTM using a collimated light source.
Figure 9B:
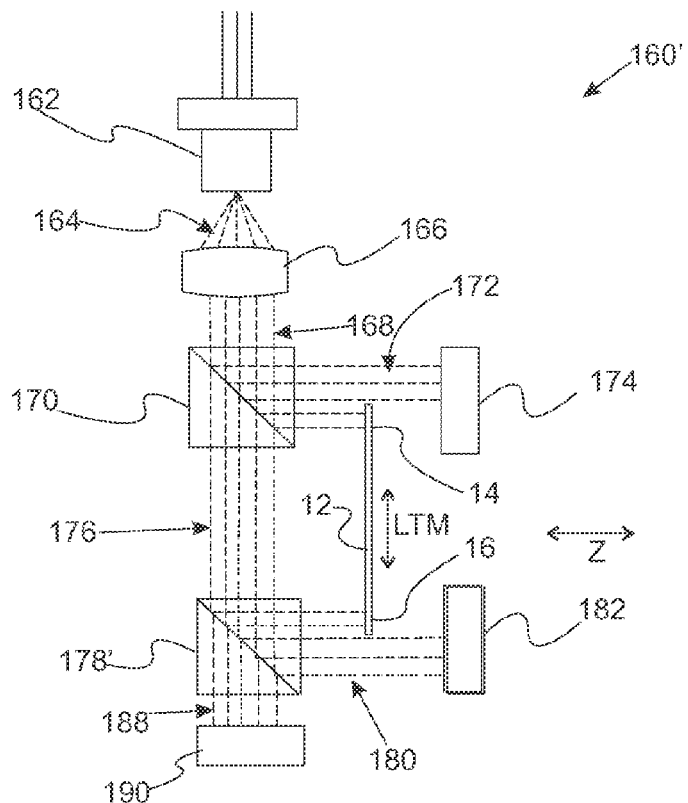
FIG. 9B provides a refinement of the system of FIG. 7A in which a third photo-detector useful for normalization is utilized.

FIG. 9A provides a schematic of a system for detecting lateral tape movement in a storage tape drive in which the top and bottom tape edges are monitored to determine LTM using a collimated light source. System 160 includes photo-emitter 162 which is typically a laser diode. Photo-emitter 162 emits a light signal 164 which is collimated by lens 166 which is used to collimate light signal 164 to form a collimated light signal 168. First optical device 170 reflects a first portion 172 of collimated light signal 168 towards photo-detector 174. Tape edge 14 blocks a portion of first portion 172 thereby allowing assessment of LTM. First optical device 170 also transmits a second portion 176 towards second optical device 178. In a refinement, first optical device 178 is a beam splitter. Second optical device 178 reflects a third portion 180 of collimated light signal 168 towards photo-detector 182. Tape edge 16 blocks a portion of third portion 180 thereby allowing assessment of LTM. In a refinement, second optical device 178 is either a mirror or beam splitter. The present variation allows the detection of LTM independent of the tape 12's Z-position. FIG. 9B provides a refinement of the system of FIG. 9A. In this refinement, system 160' includes second optical device 178' which reflects a third portion 180 of collimated light signal 168 towards photo-detector 182 and transmits a fourth portion 188 towards photo-detector 190. The output signal from photo-detector 190 allows for normalization of system 160 so that fluctuation of the light intensity of light signal 168 is compensated. The laser edge sensor of the present embodiment can be designed with a very small footprint which is helpful for mounting into tight spaces around a tape path, either in a laboratory test fixture or a tape drive product.

Figure 10:
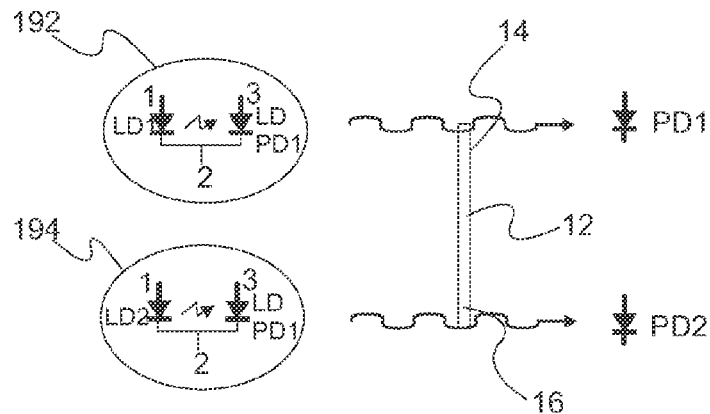
FIG. 10 provides a schematic of a photo-laser diode and a photo-detector arrangement in which the photo-laser diode provides a normalization output.
Figure 11A:
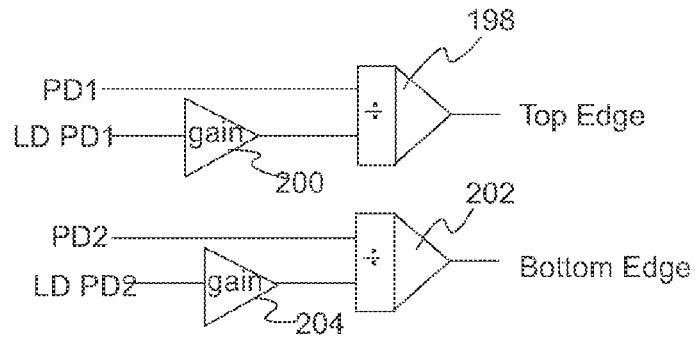
FIGS. 11A-C provide configurations for utilizing the normalization output of FIG. 10.
Figure 11B:
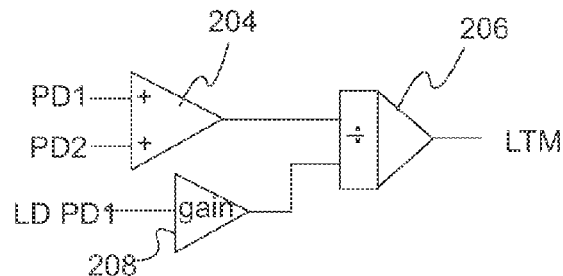
Figure 11C:
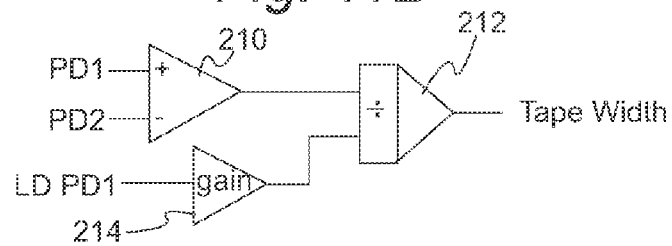

With reference to FIGS. 10 and 11A-C, a variation to reduce noise in the signal derived from the photodiodes is provided. Such noise translates to errors in the LTM measurement. In order to reduce noise as much as possible in this type of sensor, relative intensity noise in the laser beam is reduced as a contributor to measurement error by normalizing the signals. This can be done by dividing the signals indicating edge movement or LTM by a signal representing the total power in the laser beam. Referring to FIG. 10, laser diode devices 192, 194 emit a light signal that is received by photo-detectors PD1 and PD2, respectively. The light signals are partially obstructed by top edge 14 and bottom edge 16 of storage tape 12 as set forth above. A signal representing the total beam power can be derived from the laser diode device's back-facet detector identified as LDPD1 and LDPD1. Detectors LDPD1 and LDPD2 receive a portion of the light derived from laser diode PD1 of laser diode device 192 and from laser diode PD2 of laser diode device 194. FIGS. 11A, 11B, and 11C provide various configuration for using the outputs of LDPD1 and LDPD2. Referring to FIG. 11A, a configuration for measuring the top edge and bottom edge signals is provided. In this configuration, the output of PD1 and the amplified output LDPD1 is provided to voltage divider 198. Amplification of PD1 is accomplished via amplifier 200. Similarly, the output of PD2 and the amplified output LDPD2 is provided to voltage divider 202. Amplification of PD2 is accomplished via amplifier 204. Referring to FIG. 11B, a configuration for directly measuring LTM is provided. In this configuration, the outputs of PD1 and PD2 are provided to voltage adder 204. The output of voltage adder 204 and the amplified output LDPD1 are provided to voltage divider 206. Amplification of LDPD1 is accomplished via amplifier 208. Referring to FIG. 11C, a configuration for tape width is provided. In this configuration, the outputs of PD1 and PD2 are provided to differential amplifier 210. The output of differential amplifier 210 and the amplified output LDPD1 is provided to voltage divider 212. Amplification of LDPD1 is accomplished via amplifier 214. The methods associated with FIGS. 11A-C allow laser power variation to be compensated in the final measurements with signal normalization being accomplished using an analog electronic circuit or a digital signal processor after signals have been digitized.

Figure 12:
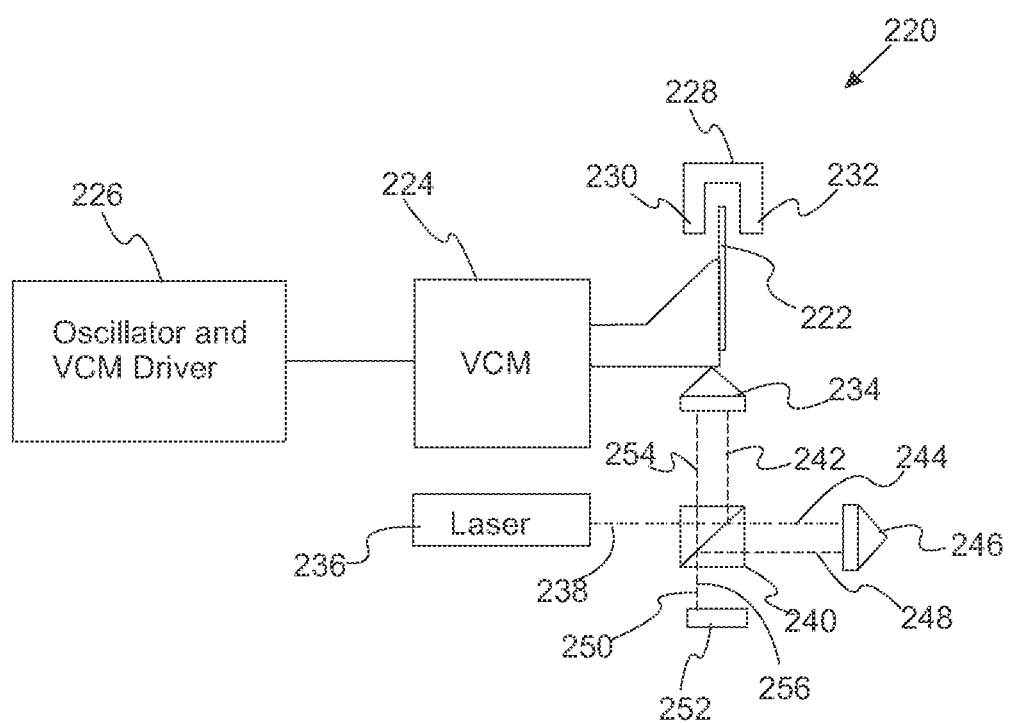
FIG. 12 provides a schematic illustration of a calibration system for calibrating the linear region of the transfer function for a tape edge sensor system.
Figure 13:
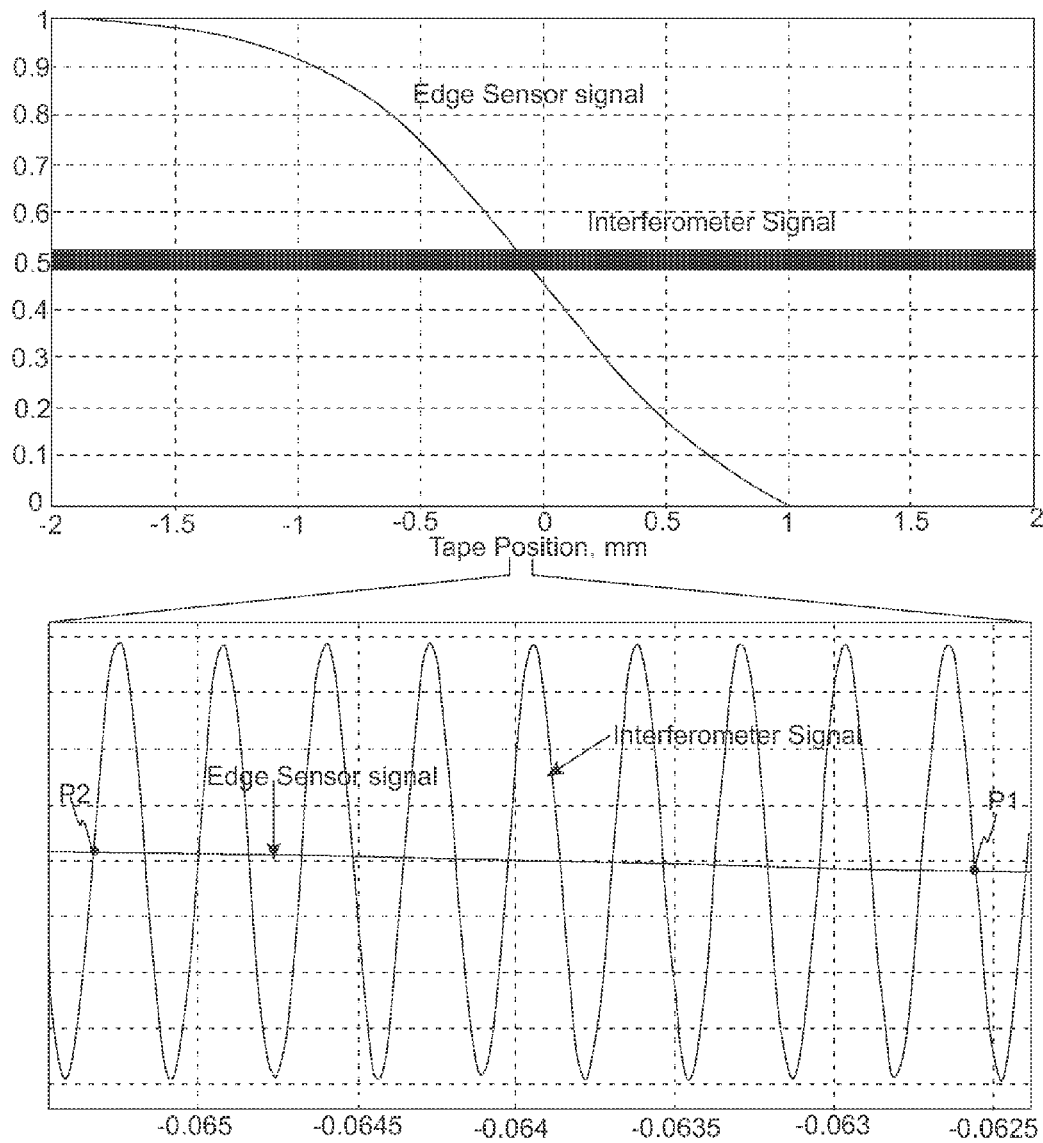
FIG. 13 provides plots illustrating the overlap of the output of the calibration system of FIG. 12 with the linear region of the tape transfer function.

With reference to FIG. 12, a system for calibrating a tape edge sensor is provided. In order to achieve a high level of measurement accuracy, tape edge sensors require precise calibration. The most critical portion of a sensor's transfer function is near its midpoint—the linear measurement region. A calibration method that precisely measures tape motion simultaneously with the edge sensor's output signal gives the desired information: the slope of the transfer function in the measurement region. Calibration system 220 includes planar calibration substrate 222 (e.g., a small sample of tape material) and linear translation device 224 that moves the planar calibration substrate in a linear direction $d_7$. Typically, linear translation device 224 is a voice coil motor which is driven by a sine wave signal from a low frequency ($\approx$10 Hz) oscillator 226 to move a small sample of tape material. Light source 230 and photo-detector 232 are part of tape edge sensor 228. Light source 230 emits a light signal that is received by photo-detector 232 with a portion of the light signal being blocked by planar substrate 222. Planar calibration substrate 222 is positioned in tape edge sensor 228 so that the central region of the sensor's transfer function is swept by linear translation device 224. Moveable reflector 234 is attached to linear translation device 224 that moves in unison with planar calibration substrate 222. System 220 also includes laser 236 which emits monochromatic light signal 238. Cube beam splitter 240 reflects first portion 242 of the light signal towards moveable reflector 234 and transmits a second portion 244 of the light signal towards stationary reflector 246. Stationary reflector 246 directs a third portion 248 of the light signal back towards the beam splitter 240 where fourth portion 250 of the light is directed towards photo-detector 252. In a refinement, both moveable reflector 234 and stationery reflector are corner cube reflectors. Moveable reflector 234 reflects fifth portion 254 of the light signal back towards the beam splitter 240 where a sixth portion 256 of the light signal is transmitted to the photo-detector 252 (e.g., a photodiode). Fourth portion 250 of the light signal and sixth portion 256 of the light signal constructively and destructively combine to form an interferometer signal (e.g., an interference pattern) as a function of position of the planar calibration substrate 222. The interference pattern has a period that allows determination of a distance traversed by the planar calibration substrate. The resulting interferometer signal from photo-detector 252 is a sine wave whose period represents motion of linear translation device 224 equal to ½ the wavelength of the laser ($\lambda$/2). For a 650 nm (red) laser diode, this period represents 325 nm. FIG. 13 provides an example of the output of the calibration system superimposed over a plot of the edge sensor's transfer function. The slope in the linear region is estimated from the distance between points P1 and P2 by counting the number of cycles intersecting the transfer function. The slope of the transfer function (volts/nanometer) is calculated from the signals generated by this calibration method. To achieve high absolute accuracy, the laser's wavelength must be accurately known, for example, by measuring it with an optical spectrometer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape edge sensor system for detecting lateral movement of a storage tape in a storage tape drive, the storage tape having a first tape edge, a second tape edge, a first tape side and a second tape side, lateral tape motion being movement of the storage tape in a direction perpendicular of storage tape movement during read/write operations, the system comprising:

a first photo-emitter emitting a first light signal, the first photo-emitter being modulated such that the first light signal is also modulated;

a first photo-detector positioned to receive a portion of the first light signal and provides a first detected signal proportional to the portion of the first light signal received by the first photo-detector;

a first baffle defining a first aperture, the first baffle disposed between the first photo-emitter and the first photo-detector, the first aperture defining a first region at the first tape edge at which lateral tape motion is detected, the first tape edge partially blocking the first light signal thereby defining along with the first aperture the portion of the first light signal received by the first photo-detector such that variations in the portion of the first light signal received by the first photo-detector occur at least in part due to lateral tape motion;

a second photo-emitter that emits a second light signal, the second photo-emitter being modulated such that the second light signal is also modulated;

a second photo-detector positioned to receive a portion of the second light signal from the second photo-emitter and provides a second detected signal proportional to the portion of the second light signal received by the second photo-detector;

a second baffle defining a second aperture, the second baffle disposed between the second photo-emitter and the second photo-detector, the second aperture defining a second region at the second tape edge at which lateral tape motion is detected, the second tape edge partially blocking the second light signal thereby defining along with the second aperture the portion of the second light signal received by the second photo-detector such that variations in the portion of the second signal received by the second photo-detector occur at least in part due to lateral tape motion;

a third photo-emitter that emits a third light signal, the third photo-emitter being modulated such that the third light signal is also modulated;

a third photo-detector positioned to receive a portion of the third light signal from the third photo-emitter and provides a third detected signal proportional to the portion of the third light signal received by the third photo-detector;

a third baffle defining a third aperture, the third baffle disposed between the third photo-emitter and the third photo-detector the third aperture defining a third region at the first tape edge at which lateral tape motion is detected, the first tape edge partially blocking the third light signal thereby defining along with the third aperture the portion of the third light signal received by the third photo-detector such that variations in the portion of the third light signal received by the third photo-detector occur at least in part due to lateral tape motion;

a fourth photo-emitter that emits a fourth light signal, the fourth photo-emitter being modulated such that the first light signal is also modulated;

a fourth photo-detector positioned to receive a portion of the fourth light signal from the fourth photo-emitter and provides a fourth detected signal proportional to the portion of the fourth light signal received by the fourth photo-detector;

a fourth baffle defining a fourth aperture, the fourth baffle disposed between the fourth photo-emitter and the fourth photo-detector, the fourth aperture defining a fourth region at the second tape edge at which lateral tape motion is detected, the second tape edge partially blocking the fourth light signal thereby defining with the fourth aperture the portion of the fourth light signal received by the fourth photo-detector such that variations in the portion of the fourth signal received by the fourth photo-detector occur at least in part due to lateral tape motion; and a feedback system connected to the first photo-emitter, the second photo-emitter, the third photo-emitter, the fourth photo-emitter, the first photo-detector, the second photo-detector, the third photo-detector, and the fourth photo-detector; the feedback system providing modulation of the first photo-emitter, the second photo-emitter the third photo-emitter and the fourth photo-emitter, the feedback system also providing low pass filtering of the first detected signal, the second detected signal, the third detected signal, and the fourth detected signal to minimize interference from noise and signal drift.

2. The system of claim 1 wherein the first photo-emitter, the second photo-emitter, the third photo-emitter and the fourth photo-emitter are synchronously rectified with outputs from the first photo-detector, the second photo-detector, the third photo-detector and the fourth photo-emitter each independently being filtered with a low pass filter.

3. The system of claim 1 wherein the first light signal, the second light signal, the third light signal and the fourth light signal are each independently amplitude modulated.

4. The system of claim 1 wherein the first aperture is generally rectangular having a first length and a first width, the first length being greater than the first width.

5. The system of claim 4 wherein the first length is positioned substantially parallel to a direction of motion of the storage tape such that lateral tape motion measurement is substantially insensitive to tape edge roughness.

6. The system of claim 4 wherein the first length is positioned substantially perpendicular to a direction of motion of the storage tape.

7. The system of claim 1 wherein the feedback system provides a normalized scaling compensating for drift in the first light signal over time.

8. A system that compensates for flutter movement of a storage tape in a storage tape drive, the storage tape having a first tape edge, a second tape edge, a first tape side and a second tape side, the system comprising:

a first photo-emitter that emits a first non-collimated light signal, the first photo-emitter positioned at the first tape edge adjacent to the first tape side;

a first photo-detector positioned at the first tape edge adjacent to the second tape side to receive a portion of the first non-collimated light signal and output a first detection signal, the first non-collimated light signal being partially blocked by the storage tape at the first tape edge;

a second photo-emitter that emits a second non-collimated light signal, the second photo-emitter positioned at the second tape edge adjacent to the second tape side; and a second photo-detector positioned at the second tape edge adjacent to the first tape side to receive a portion of the second non-collimated light signal and output a second detection signal, the second non-collimated light signal being partially blocked by the storage tape at the first tape edge; and a control component that combines the first detection signal and the second detection signal such that motion of the storage tape in a direction perpendicular to a tape side is compensated for in a transfer function by positioning of the first photo-emitter and the second photo-emitter on opposite sides of the storage tape and the first photo-detector and the second photo-detector on opposite sides of the storage tape.

9. The system of claim 8 wherein a first photo-interrupter includes the first photo-emitter and the first photo-detector and a second photo-interrupter includes the second photo-emitter and the second photo-detector.

10. A system that compensates for flutter movement of a storage tape in a storage tape drive, the storage tape having a first tape edge, a second tape edge, a first tape side and a second tape side, the system comprising:

a photo-emitter that emits a light signal, a first portion of the light signal being directed towards the first tape edge;

a lens that shapes the light signal; and a first photo-detector positioned adjacent to the second side and to receive the first portion of the light signal, the first portion of the light signal being partially blocked by the storage tape at the first tape edge;

a first optical device that reflects the first portion of the light signal towards the first tape edge and transmits a second portion of the light signal;

a second optical device that reflects a third portion of the light signal towards the second tape edge; and a second photo-detector positioned adjacent to the second tape side to receive the third portion of the light signal, the second portion of the light signal being partially blocked by the storage tape at the second tape edge.

11. The system of claim 10 wherein the lens shapes the light signal into an oblong pattern having a long axis and a short axis.

12. The system of claim 11 wherein the long axis is substantially perpendicular to the first tape edge.

13. The system of claim 11 wherein the long axis is substantially parallel to the first tape edge.

14. The system of claim 11 further comprising a third photo-detector, wherein the second optical device transmits a fourth portion of the light signal towards the third photo-detector with the third photo-detector outputting a normalization signal.

15. A system for calibrating a tape edge sensor, the system comprising:
- a planar calibration substrate;
- a linear translation device that moves the planar calibration substrate in a linear direction;
- a monochromatic light source that emits a light signal;
- a photo-detector;
- a moveable reflector attached to the linear translation device that moves in unison with the planar calibration substrate;
- a stationary reflector; and
- a beam splitter that directs a first portion of the light signal towards the moveable reflector and a second portion of the light signal towards the stationary reflector, the stationary reflector directing a third portion of the light signal back towards the beam splitter where a fourth portion of the light is directed towards the photo-detector, the moveable reflector reflecting a fifth portion of the light signal back towards the beam splitter where a sixth portion of the light signal is transmitted to the photo-detector, the fourth portion of the light signal and the sixth portion of the light signal constructively and destructively combining to form an interference pattern as a function of position of the planar calibration substrate, the interference pattern having a period that allows determination of a distance traversed by the planar calibration substrate, the tape edge sensor having an associated transfer function, the planar calibration substrate being positioned at a location in the tape edge sensor where the transfer function is approximately linear with a slope, the distance traversed being used to calculate the slope of the transfer function.

16. The system of claim 15 wherein the linear translation device is a voice coil.

* * * * *

UNITED STATES PATENT AND TRADEMARK OFFICE
CERTIFICATE OF CORRECTION

PATENT NO. : 8,760,786 B2
APPLICATION NO. : 13/531875
DATED : June 24, 2014
INVENTOR(S) : Mahnad et al.

It is certified that error appears in the above-identified patent and that said Letters Patent is hereby corrected as shown below:

In the Specification

Column 1, line 19, delete "contamination" and insert -- contamination. --, therefor.

Column 7, line 26, delete "$LTM_a$," and insert -- $LTM_d$ --, therefor.

Column 7, line 38, delete "LTMb(t)" and insert -- LTMb(t). --, therefor.

Signed and Sealed this
Twenty-fourth Day of February, 2015

Michelle K. Lee
*Deputy Director of the United States Patent and Trademark Office*